United States Patent
Chen et al.

(10) Patent No.: US 12,493,975 B2
(45) Date of Patent: Dec. 9, 2025

(54) METHOD FOR GENERATING A VEHICLE-MOUNTED SMART STICKER AND VEHICLE-MOUNTED SMART STICKER SYSTEM CAPABLE OF NON-OVERLAPPING AT LEAST ONE OBJECT IMAGE IN REAL-TIME

(71) Applicant: ArcSoft Corporation Limited, Zhejiang (CN)

(72) Inventors: Tao Chen, Hangzhou (CN); Zhaofeng Li, Hangzhou (CN); Yanhong Chen, Hangzhou (CN); Jie Chen, Hangzhou (CN); Xujing Hong, Hangzhou (CN); Shuangzhong Qiu, Hangzhou (CN)

(73) Assignee: ArcSoft Corporation Limited, Zhejiang (CN)

( * ) Notice: Subject to any disclaimer, the term of this patent is extended or adjusted under 35 U.S.C. 154(b) by 307 days.

(21) Appl. No.: 18/133,542

(22) Filed: Apr. 12, 2023

(65) Prior Publication Data

US 2023/0342968 A1 Oct. 26, 2023

(30) Foreign Application Priority Data

Apr. 26, 2022 (CN) .......................... 202210444724.X

(51) Int. Cl.
*G06T 7/70* (2017.01)
(52) U.S. Cl.
CPC ....................................... *G06T 7/70* (2017.01)

(58) Field of Classification Search
CPC . G06T 2207/20081; G06T 2207/20084; G06T 2207/30268; G06T 7/70; G06T 7/73
See application file for complete search history.

(56) References Cited

U.S. PATENT DOCUMENTS

| | | | |
|---|---|---|---|
| 2019/0057509 A1* | 2/2019 | Lv | G06T 7/11 |
| 2019/0172230 A1* | 6/2019 | Mailhe | G06T 5/20 |
| 2019/0259163 A1* | 8/2019 | Mao | A61B 3/102 |
| 2019/0287674 A1* | 9/2019 | Nitta | G16H 30/40 |
| 2021/0042724 A1* | 2/2021 | Rathod | G07G 1/0054 |
| 2021/0149941 A1* | 5/2021 | Moskowitz | G16H 50/20 |
| 2021/0311162 A1* | 10/2021 | Mai | G01S 7/415 |
| 2021/0316748 A1* | 10/2021 | Hsu | B60W 40/04 |

\* cited by examiner

*Primary Examiner* — Ming Wu
(74) *Attorney, Agent, or Firm* — Winston Hsu

(57) ABSTRACT

A method for generating a vehicle-mounted smart sticker includes acquiring model data of a vehicle body space, positioning at least one region inside the vehicle body space by using at least one image capturing device, tracking at least one object inside the vehicle body space for positioning at least one object image, and generating an image layer of a smart sticker according to the model data of the vehicle body space, positioning data of the at least one region inside the vehicle body space, and the at least one object image. A range of the image layer of the smart sticker corresponds to a range of the at least one region. The image layer of the smart sticker and the at least one object image are non-overlapped.

10 Claims, 4 Drawing Sheets

METHOD FOR GENERATING A VEHICLE-MOUNTED SMART STICKER AND VEHICLE-MOUNTED SMART STICKER SYSTEM CAPABLE OF NON-OVERLAPPING AT LEAST ONE OBJECT IMAGE IN REAL-TIME

BACKGROUND OF THE INVENTION

1. Field of the Invention

The present invention illustrates a method for generating a vehicle-mounted smart sticker and a vehicle-mounted smart sticker system, and more particularly, a method for generating the vehicle-mounted smart sticker and a vehicle-mounted smart sticker system capable of non-Overlapping at least one object image in real-time.

2. Description of the Prior Art

With the rapid development of science and technology, intelligence vehicle applications are popularly adopted in our daily life. Various end-user vehicle application programs can also be implemented for facilitating corresponding function operations of the vehicles. For example, smart stickers are popularly performed by mobile devices. Further, the smart stickers are also being considered by many car manufacturers for applying to various cars. Unlike the mobile device, the vehicle has a vehicle body space. Currently, functions of application programs associating with the smart stickers are mainly applied to operation points of the mobile devices, such as a virtual face decoration operation, a virtual body clothing decoration operation, and a hair decoration operation. Particularly, the application programs of the smart stickers can directly overlay image layers of the smart stickers on specific regions. Therefore, in output images of the conventional smart sticker applications, when the specific regions include at least one object, some details of at least one object can be disappeared since the image layers of the smart stickers are directly overlaid on the specific regions. Further, since the application programs of the smart stickers lack a satisfactory positioning system, alignment between the smart sticker and the covered region is inaccurate.

Therefore, it is an important issue to design a smart sticker technology that can accurately cover specific regions in the vehicle body space without sacrificing details of objects, leading to an immersive visual experience for the user.

SUMMARY OF THE INVENTION

In an embodiment of the present invention, a method for generating a vehicle-mounted smart sticker is disclosed. The method comprises acquiring model data of a vehicle body space, positioning at least one region inside the vehicle body space by using at least one image capturing device, tracking at least one object inside the vehicle body space for positioning at least one object image, and generating an image layer of a smart sticker according to the model data of the vehicle body space, positioning data of the at least one region inside the vehicle body space, and the at least one object image. A range of the image layer of the smart sticker corresponds to a range of the at least one region. The image layer of the smart sticker and the at least one object image are non-overlapped.

In another embodiment of the present invention, a vehicle-mounted smart sticker system is disclosed. The vehicle-mounted smart sticker system includes at least one image capturing device, a storage module, a sharing module, a processor, and an output module. The at least one image capturing device is configured to acquire an image information stream. The storage module is configured to save data. The sharing module is coupled to the storage module and configured to share data through a network. The processor is coupled to the at least one image capturing device and the storage module and configured to process the image information stream. The output module is coupled to the sharing module and configured to output a processed image information stream. After the processor acquires model data of a vehicle body space, the processor controls the at least one image capturing device for positioning at least one region inside the vehicle body space. The processor tracks at least one object disposed inside the vehicle body space for positioning at least one object image. The processor generates an image layer of a smart sticker according to the model data of the vehicle body space, positioning data of the at least one region inside the vehicle body space, and the at least one object image. The processor processes the image information stream accordingly. A range of the image layer of the smart sticker corresponds to a range of the at least one region. The image layer of the smart sticker and the at least one object image are non-overlapped.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
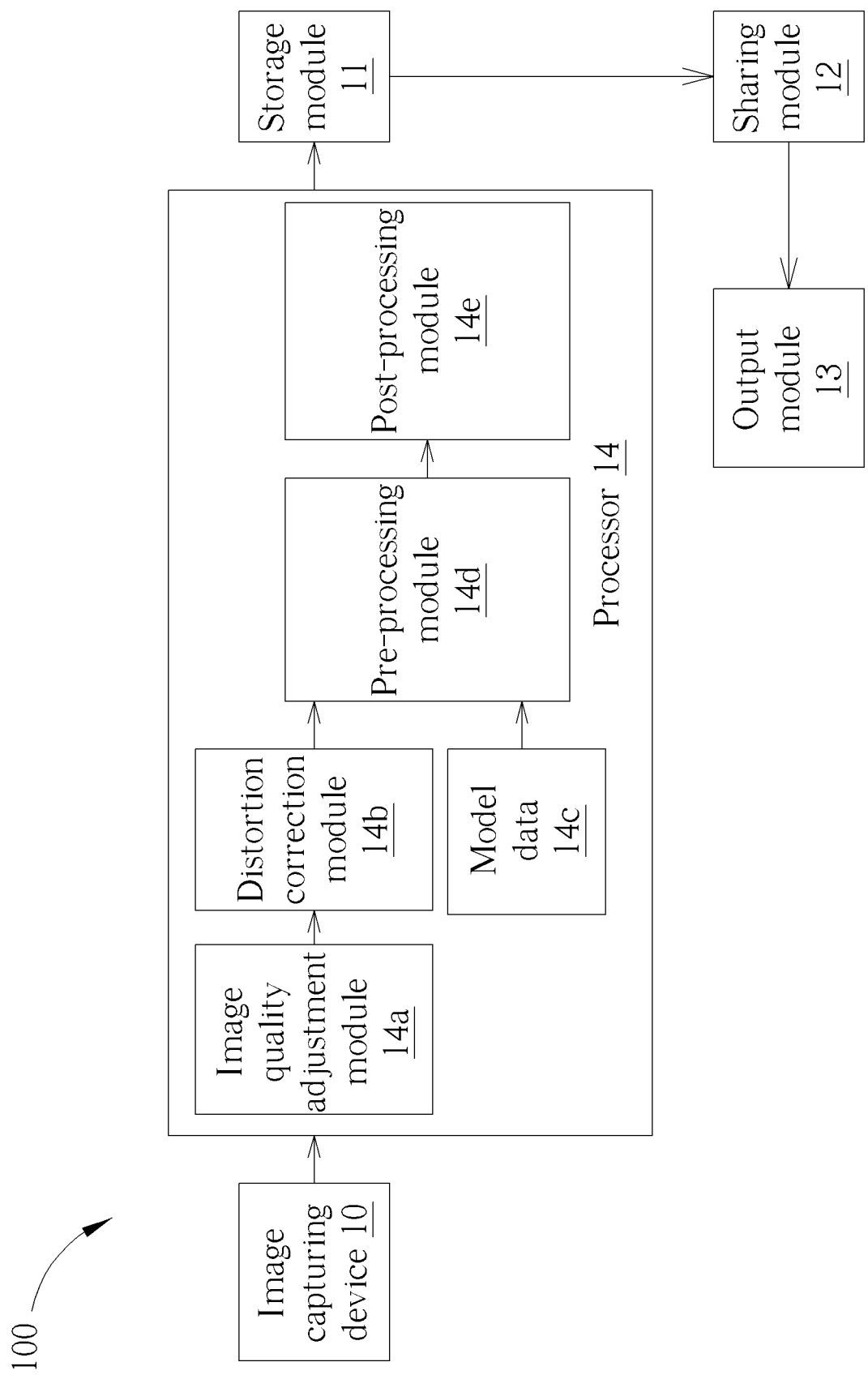
FIG. 1 is a block diagram of a vehicle-mounted smart sticker system according to an embodiment of the present invention.

FIG. 1 is a block diagram of a vehicle-mounted smart sticker system 100 according to an embodiment of the present invention. For simplicity, the vehicle-mounted smart sticker system 100 is called as a smart sticker system 100 hereafter. The smart sticker system 100 includes at least one image capturing device 10, a storage module 11, a sharing module 12, an output module 13, and a processor 14. The at least one image capturing device 10 is used for acquiring an image information stream. The image capturing device 10 can be a camera lens, a video recorder, or an image recorder. The image information stream can include static photo data or dynamic video data. The number of the image capturing devices 10 and the function of the image capturing devices 10 are not limited to the embodiment in FIG. 1. The storage module 11 is used for saving data, such as a processed smart sticker image layer. The storage module 11 can be a memory, a hard disk, or a cloud server space. The sharing module 12 is coupled to the storage module 11 for sharing data through a network. For example, the sharing module 12 can share data through an Internet of Vehicles (T-Box), a Wireless Fidelity (Wi-Fi) protocol, or a Bluetooth protocol. The output module 13 is coupled to the sharing module 12 for outputting the processed image information stream. The output module 13 can be a cloud mobile device terminal. The processor 14 is coupled to the at least one image capturing device 10 and the storage module 11 for processing the image information stream. The processor 14 can be a system on chip (SoC) or any programmable processing device. In the smart sticker system 100, after the processor 14 acquires model data 14c of the vehicle body space, the processor 14 can control the at least one image capturing device 10 for positioning at least one region inside the vehicle body space. The processor 14 can track at least one object disposed inside the vehicle body space for positioning at least one object image. Then, the processor 14 can generate an image layer of a smart sticker according to the model data 14c of the vehicle body space, positioning data of the at least one region inside the vehicle body space, and the at least one object image. Further, the processor 14 can process the image information stream accordingly. Then, a range of the image layer of the smart sticker corresponds to a range of the at least one region. Specifically, the image layer of the smart sticker and the at least one object image are non-overlapped. The model data of the vehicle body space can include three-dimensional vehicle body space model data. The image layer of the smart sticker is a two-dimensional plane graphic. In other words, the smart sticker system 100 can precisely align the smart sticker to a specific region without sacrificing details of the at least one object image (i.e., a human-shaped image). Therefore, the smart sticker system 100 can simulate an immersive virtual environment to increase the user's visual experience. A method for generating a vehicle-mounted smart sticker by the smart sticker system 100 is illustrated later.

In the smart sticker system 100, the processor 14 can perform operations of neural networks. Therefore, artificial intelligence technologies of deep learning and machine learning can be implemented. The smart sticker system 100 can input the model data 14c of the vehicle body space into the neural network to train the neural network. After the neural network is trained, the trained neural network can be used for identifying the at least one region inside the vehicle body space. For example, the neural network can be used for identifying glass material regions in the body space, such as windows, windshields, and mirrors. The smart sticker system 100 can designate the at least one region by a user. For example, the user can designate the glass material regions in the body space, such as the windows, the windshields, and the mirrors. Similarly, after the neural network is trained, the trained neural network can be used for identifying the at least one region inside the vehicle body space. Further, the neural network can determine the at least one region inside the vehicle body space by using an intelligent segmentation technology according to the model data 13c of the vehicle body space. For example, the neural network can use the intelligent segmentation technology for determining the glass material regions in the body space, such as the windows, the windshields, and the mirrors. Any reasonable technology modification falls into the scope of the present invention. The aforementioned method of identifying the at least one region inside the vehicle body space by using the neural network belongs to a rough positioning technology of the at least one region. In the smart sticker system 100, the image capturing device 10 can detect a plurality of vertices of the at least one region. For example, the image capture device 10 can detect a plurality of vertices of a polygonal window. Then, the processor 14 can position the at least one region according to the plurality of vertices of the at least one region. Further, the processor 14 can detect three-dimensional coordinates of the plurality of vertices in vehicle body space. Therefore, using the positioning information acquired by the image capturing device 10 for positioning the at least one region belongs to a precise positioning technology of the at least one region.

In FIG. 1, after the image capture device 10 acquires the image information stream, the image information stream can be transmitted to the processor 14 through a communication protocol. The processor 14 includes an image quality adjustment module 14a, a distortion correction module 14b, model data 14c of the vehicle body space, a pre-processing module 14d, and a post-processing module 14e. After the processor 14 receives the image information stream, the processor 14 can use the image quality adjustment module 14a for adjusting a brightness parameter, a white balance parameter, a saturation parameter, a contrast parameter, and a noise reduction parameter of the image. Then, the image can be transmitted to the distortion correction module 14b. The distortion correction module 14b can adjust the distortion of the image, such as wide-angle distortion or a cylindrical distortion. The model data 14c of the vehicle body space can include model data of the three-dimensional vehicle body space. Further, the model data 14c can be pre-saved in a memory of the processor 14. The pre-processing module 14d can process the image after the quality improvement and the distortion correction are introduced to the image according to the model data 14c of the vehicle body space, as illustrated below. For simplicity, the at least one object of the vehicle body space includes at least one humanoid object of the vehicle body space. The pre-processing module 14d can perform an object segmentation technology and a portrait segmentation technology. The object segmentation technology can identify various regions in the vehicle body space and can further separate a glass region from other regions. The object segmentation technology can be performed by the deep learning technology of the artificial intelligence according to deployment scenes and platform characteristics, network structures, training data, and learning strategies. Therefore, the segmentation results can be optimized. Further, the object segmentation technology can be combined with a network storage device (NAS), knowledge distillation technology, and in-depth optimization of the low layer's codes. In the portrait segmentation technology, the pre-processing module 14d can detect a contour boundary of the at least one humanoid object of the vehicle body space. Then, the pre-processing module 14d can separate an image of the at least one humanoid object from a background according to the contour boundary of the at least one humanoid object. Specifically, the processor 14 can label the image of the at least one humanoid object so that the image layer of the smart sticker and the image of the at least one humanoid object are non-overlapped when the image layer of the smart sticker is aligned to the at least one region.

After the pre-processing module 14d in the processor 14 performs the portrait segmentation technology and the object segmentation technology, the image data can be transmitted to the post-processing module 14e. The post-processing module 14e can perform a perspective deformation process and a fitting process to the image layer of the smart sticker according to the identified glass region, as illustrated below. First, the post-processing module 14e can detect a plurality of vertices of the at least one region to be divided. Then, the post-processing module 14e can rotate the image layer of the smart sticker according to a position and an angle of the at least one image capturing device 10 for aligning the image layer of the smart sticker to the at least one region. As previously mentioned, the at least one region can include the glass material region. Further, the at least one region can be generated by using a glass segmentation technology. In the smart sticker system 100, a low layer of the glass segmentation technology can be performed by using the deep learning technology of artificial intelligence. For example, the glass segmentation technology can use a fixed camera disposed inside the car for collecting a large number of different scene images. Then, the glass segmentation technology can label ground truth values for any window glass region according to customized rules. The glass segmentation technology can also use a U-Net deep learning model and a normalized exponential function (Softmax) cross-entropy for calculating a minimum loss optimization network with a ground truth mask. Then, the glass segmentation technology can optimize the segmentation results for acquiring a final mask. The post-processing module 14e can also analyze the image information stream for aligning the image layer of the smart sticker to the at least one region. The image layer of the smart sticker and an image of at least one humanoid object are non-overlapped. Further, the post-processing module 14e can use a portrait tracking technology for dynamically cropping a moving portrait image in real-time. Therefore, glass regions or other designated regions covered by the humanoid objects are not covered with smart stickers. Further, the image layer of the smart sticker can be generated in a form of a single-frame static image layer or a dynamic image layer varied during a frame sequence for applying to a two-dimensional surface. Then, the processed image information stream can be transmitted to the storage module 11. The processed image information stream includes synthesized image data of smart stickers and glass regions. The storage module 11 can save the processed image information stream. Then, the processed image information stream can be further transmitted to the sharing module 12. Therefore, the sharing module 12 can share the synthesized image data through an internet network. Finally, the processed image information stream can be transmitted to the output module 13. Therefore, the user can browse the synthesized image data displayed on the output module 13 after the sticker synthesized process is completed.

The following embodiments describe an actual implementation method for generating a smart sticker with at least one humanoid object and a plurality of glass regions in the vehicle body space. First, the processor 14 detects positions of the image capturing devices 10 inside the vehicle body space. Then, the processor 14 labels the positions of the image capturing device 10 and an imaging position of the glass region captured by the image capturing device 10. Then, according to the labeling parameters, the processor 14 can determine the positions of all glass regions, such as a front windshield, a rear windshield, a sunroof, and vehicle windows. Next, an image layer mask can be acquired by using the aforementioned glass segmentation technology. Next, the processor 14 can detect a human face. If the human face is detected, the portrait segmentation technology can be performed for avoiding a portrait image layer being hidden by the image layer of the smart stickers. If the human face is undetected, the processor 14 can further detect a human body. If the human body is detected, the portrait segmentation technology can be performed for avoiding the portrait image layer being hidden by the image layer of the smart stickers. In other words, if the human face or the human body is detected by the processor 14, the portrait segmentation technology can be performed. If neither the human face nor the human body is detected, it implies that there is no one in the vehicle. Therefore, the processor 14 can execute the object detection process. If at least one specific object is detected, the processor 14 can perform the aforementioned object segmentation technology. Then, the processor 14 can use the deep learning technology for partitioning the objects inside the vehicle body space. For example, the processor 14 can detect foreground objects on the rear windshield. Thus, images of the foreground objects on the rear windshield and the image layer of the smart sticker are non-overlapped. If no specific object is detected, it implies that there is no one in the vehicle and there is no object image to be processed. Therefore, the processor 14 can directly cover the smart sticker with the glass region. Any reasonable operation of processing the smart sticker, the object image, and the glass region falls into the scope of the present invention.

Figure 2:
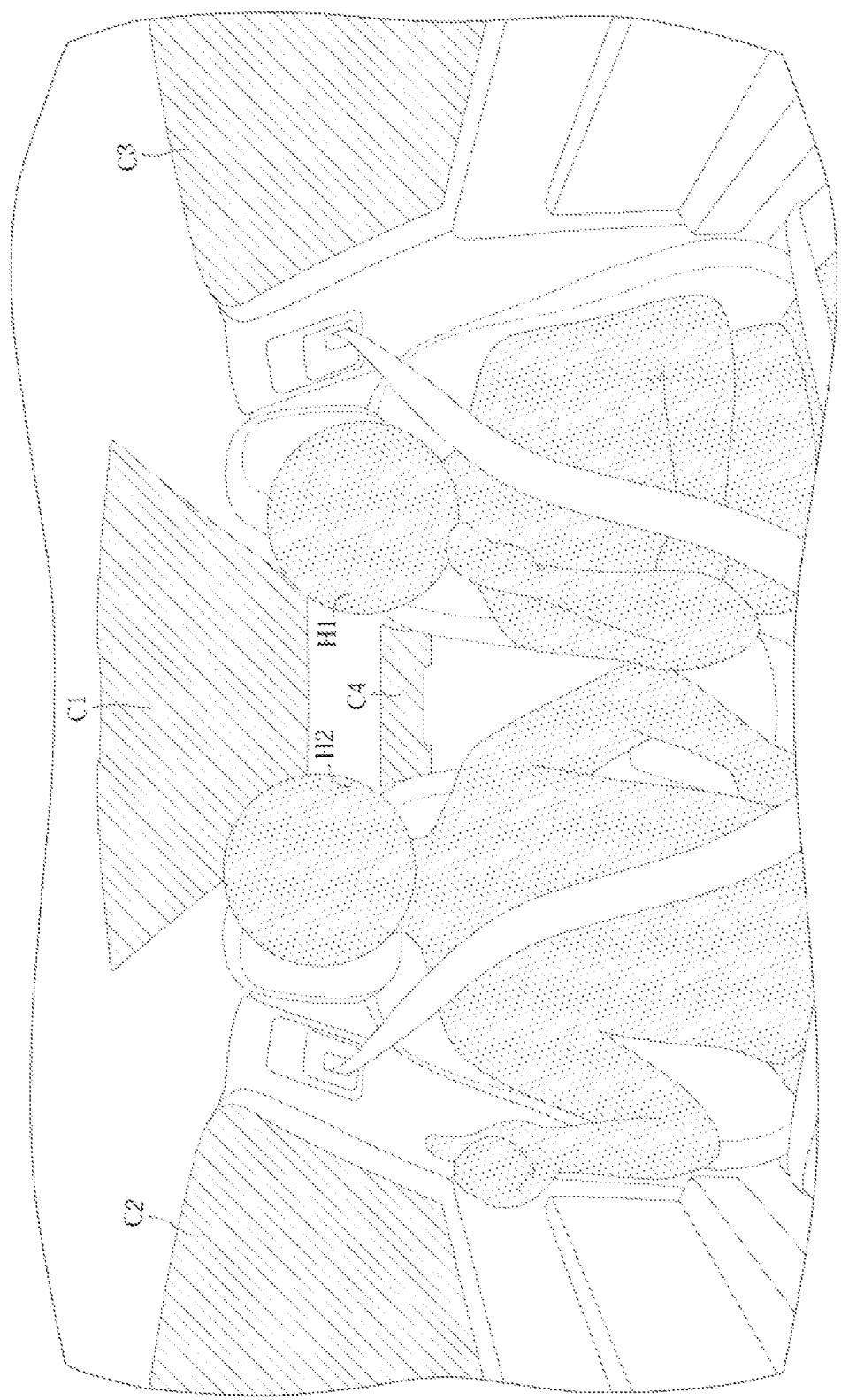
FIG. 2 is a message flow illustration of introducing a smart sticker for synthesizing a static image of the vehicle-mounted smart sticker system in FIG. 1.
Figure 3:
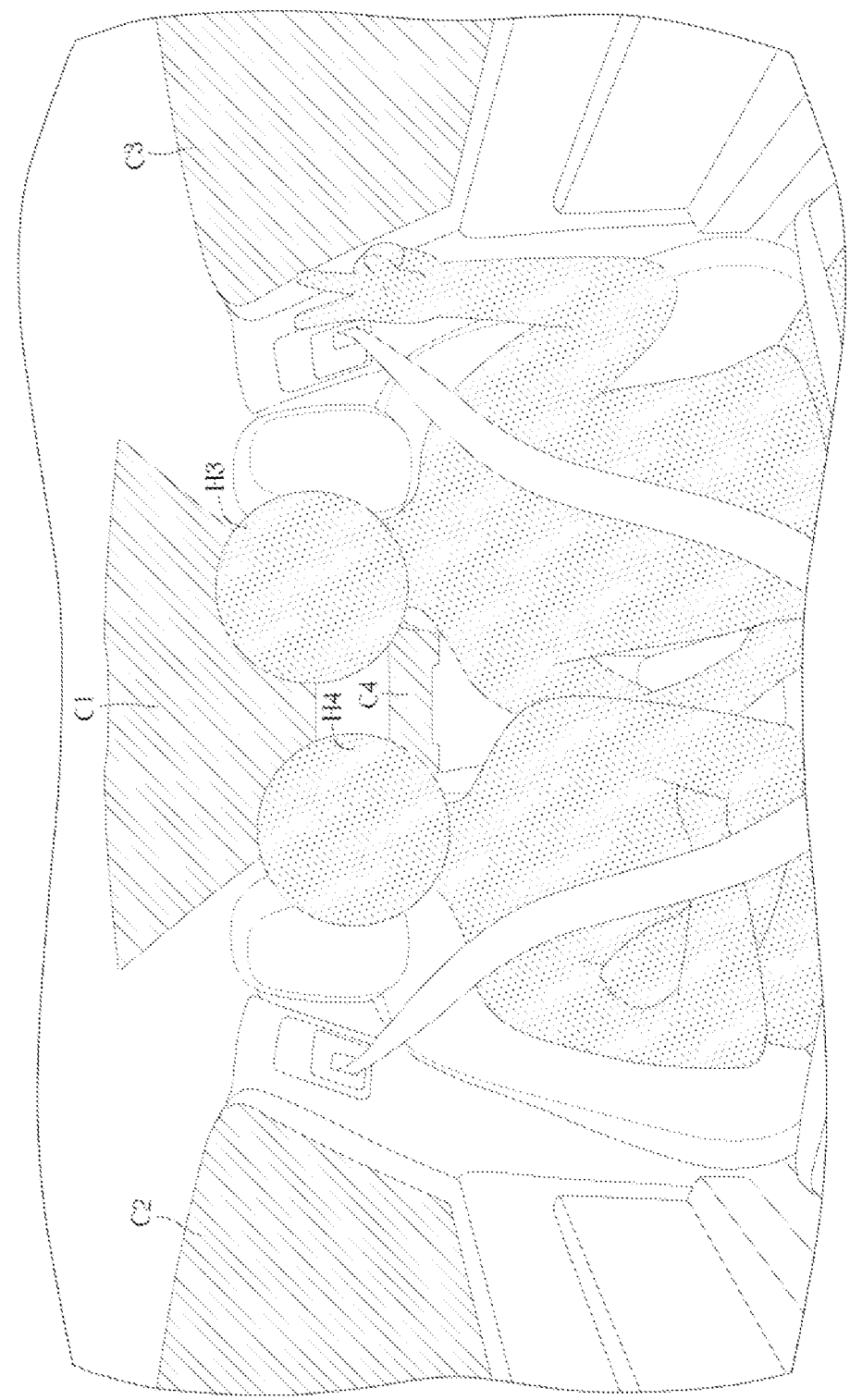
FIG. 3 is a message flow illustration of introducing the smart sticker for synthesizing a dynamic image of the vehicle-mounted smart sticker system in FIG. 1.

FIG. 2 is a message flow illustration of introducing the smart sticker for synthesizing a static image of the vehicle-mounted smart sticker system 100. FIG. 3 is a message flow illustration of introducing the smart sticker for synthesizing a dynamic image of the vehicle-mounted smart sticker system 100. As previously mentioned, the image layer of the smart sticker can be generated in a form of the single-frame static image layer or the dynamic image layer varied during the frame sequence for applying to the two-dimensional surface. In FIG. 2, an object H1 and an object H2 are two static portraits. A region C1, a region C2, a region C3, and a region C4 are glass regions. For example, the region C1 can be a skylight. The region C2 can be a right window. The region C3 can be a left window. The Region C4 can be a rear windshield. For a static image information stream, the smart sticker is generated in the form of single-frame static image. The processor 14 can detect two static portraits (i.e., objects H1 and H2). Then, the processor 14 can also use the object detection technology for detecting all foreground objects in the regions C1, C2, C3, and C4, such as a seat, a rear mirror, and a steering wheel. Finally, the processor 14 can align the smart stickers to the region C1, the region C2, the region C3, and the region C4. Further, a coverage region of the smart sticker and two static portrait images (i.e., images of the objects H1 and H2) are non-overlapped. Further, the coverage region of the smart sticker and all foreground objects are non-overlapped. Similarly, in FIG. 2, an object H1 and an object H2 are two dynamic portraits. The processor 14 can detect two dynamic portraits (i.e., objects H1 and H2). Then, the processor 14 can also use the object detection technology for detecting all foreground objects in the regions C1, C2, C3, and C4, such as the seat, the rear mirror, and the steering wheel. Finally, the processor 14 can align the smart stickers to the region C1, the region C2, the region C3, and the region C4. Further, the coverage region of the smart sticker and two dynamic portrait images (i.e., images of the objects H1 and H2) are non-overlapped. In other words, regardless of whether the image information stream is formed as a static or a dynamic data format, the smart sticker system 100 can output immersive images or videos for the user.

Figure 4:
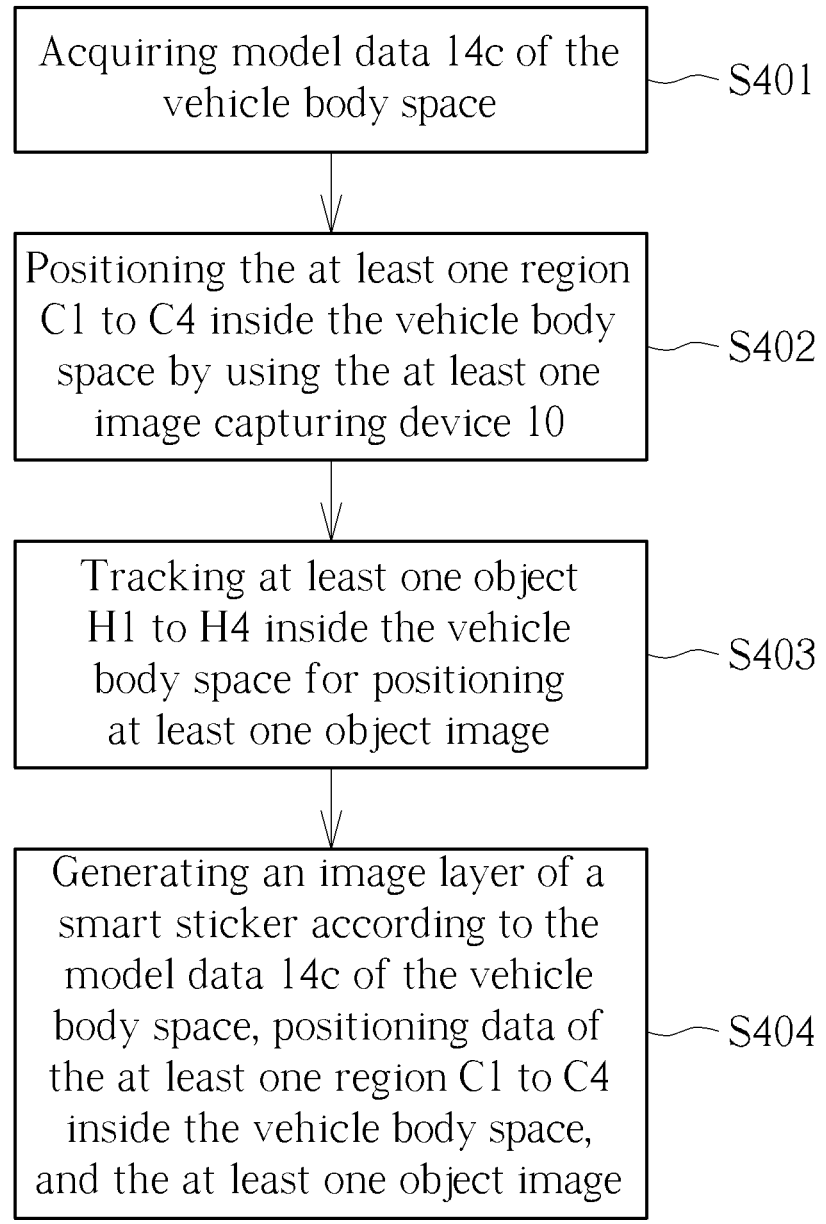
FIG. 4 is a flow chart of performing a method for generating the vehicle-mounted smart sticker by the vehicle-mounted smart sticker system in FIG. 1.

FIG. 4 is a flow chart of performing a method for generating the vehicle-mounted smart sticker by the vehicle-mounted smart sticker system 100. The method for generating the vehicle-mounted smart sticker includes step S401 to step S404. Any reasonable technology modification falls into the scope of the present invention. Step S401 to step S404 are illustrated below.

step S401: acquiring model data 14c of the vehicle body space;

step S402: positioning the at least one region C1 to C4 inside the vehicle body space by using the at least one image capturing device 10;

step S403: tracking at least one object H1 to H4 inside the vehicle body space for positioning at least one object image;

step S404: generating an image layer of a smart sticker according to the model data 14c of the vehicle body space, positioning data of the at least one region C1 to C4 inside the vehicle body space, and the at least one object image.

Details of step S401 to step S404 are previously illustrated. Thus, they are omitted here. By using step S401 to step 404, the smart sticker can align to the specific region without overlapping foreground object images or portrait images. Therefore, the smart sticker system 100 can simulate the immersive virtual environment to increase the user's visual experience.

To sum up, the present invention discloses a method for generating the vehicle-mounted smart sticker and a method for generating a vehicle-mounted smart sticker. The smart sticker system can use the object segmentation technology, the portrait tracking technology and the portrait segmentation technology for separating glass regions from portrait images. Further, the smart sticker system can detect foreground objects. Therefore, the smart sticker and the foreground object images are non-overlapped. Since the smart sticker can align to the specific region without overlapping the foreground object images or the portrait images. Therefore, the smart sticker system 100 can simulate the immersive virtual environment to increase the user's visual experience.

Those skilled in the art will readily observe that numerous modifications and alterations of the device and method can be made while retaining the teachings of the invention. Accordingly, the above disclosure should be construed as limited only by the metes and bounds of the appended claims.

What is claimed is:

1. A method for generating a vehicle-mounted smart sticker comprising:
acquiring model data of a vehicle body space;
positioning at least one region inside the vehicle body space by using at least one image capturing device;
tracking at least one object inside the vehicle body space for positioning at least one object image; and
generating an image layer of a smart sticker according to the model data of the vehicle body space, positioning data of the at least one region inside the vehicle body space, and the at least one object image;
wherein a range of the image layer of the smart sticker corresponds to a range of the at least one region, and the image layer of the smart sticker and the at least one object image are non-overlapped.

2. The method of claim 1, further comprising:
designating the at least one region; and
identifying the at least one region inside the vehicle body space by using an identification technology according to the model data of the vehicle body space;
wherein the at least one region comprises a glass material region.

3. The method of claim 1, further comprising:
inputting the model data of the vehicle body space into a neural network for training the neural network; and
identifying the at least one region inside the vehicle body space by using a trained neural network;
wherein the at least one region comprises a glass material region.

4. The method of claim 1, wherein positioning the at least one region inside the vehicle body space by using the at least one image capturing device comprises:
detecting a plurality of vertices of the at least one region by using the at least one image capturing device; and
positioning the at least one region according to the plurality of vertices of the at least one region.

5. The method of claim 4, further comprising:
rotating the image layer of the smart sticker according to a position and an angle of the at least one image capturing device for aligning the image layer of the smart sticker to the at least one region.

6. The method of claim 1, wherein the at least one object of the vehicle body space comprises at least one humanoid object of the vehicle body space, and the model data of the vehicle body space comprises three-dimensional vehicle body space model data, and the image layer of the smart sticker is a two-dimensional plane graphic.

7. The method of claim 6, further comprising:
detecting a contour boundary of the at least one humanoid object of the vehicle body space;
separating an image of the at least one humanoid object from a background according to the contour boundary of the at least one humanoid object; and
labeling the image of the at least one humanoid object so that the image layer of the smart sticker and the image of the at least one humanoid object are non-overlapped when the image layer of the smart sticker is aligned to the at least one region.

8. The method of claim 1, further comprising:
acquiring an image information stream of the vehicle body space;
analyzing the image information stream for aligning the image layer of the smart sticker to the at least one region, wherein the image layer of the smart sticker and an image of at least one humanoid object are non-overlapped; and
outputting a processed image information stream;
wherein the image information stream comprises static photo data or dynamic video data, and the image layer of the smart sticker is generated in a form of a single-frame static image layer or a dynamic image layer varied during a frame sequence.

9. The method of claim 1, further comprising:
determining the at least one region inside the vehicle body space by using an intelligent segmentation technology according to the model data of the vehicle body space.

10. A method for generating a vehicle-mounted smart sticker comprising:
at least one image capturing device configured to acquire an image information stream;
a storage module configured to save data;
a sharing module coupled to the storage module and configured to share data through a network;
a processor coupled to the at least one image capturing device and the storage module and configured to process the image information stream; and
an output module coupled to the sharing module and configured to output a processed image information stream;
wherein after the processor acquires model data of a vehicle body space, the processor controls the at least one image capturing device for positioning at least one region inside the vehicle body space, the processor tracks at least one object disposed inside the vehicle body space for positioning at least one object image, the processor generates an image layer of a smart sticker according to the model data of the vehicle body space, positioning data of the at least one region inside the vehicle body space, and the at least one object image, the processor processes the image information stream accordingly, a range of the image layer of the smart sticker corresponds to a range of the at least one region, and the image layer of the smart sticker and the at least one object image are non-overlapped.

\* \* \* \* \*